(12) United States Patent
Marchesini et al.

(10) Patent No.: US 9,108,804 B2
(45) Date of Patent: Aug. 18, 2015

(54) SCREW CONVEYOR INTERMEDIATE SUPPORT

(75) Inventors: Vainer Marchesini, San Prospero (IT); Davide Govoni, Carpi (IT)

(73) Assignee: WAMGROUP S.P.A., Modena (IT)

( * ) Notice: Subject to any disclaimer, the term of this patent is extended or adjusted under 35 U.S.C. 154(b) by 0 days.

(21) Appl. No.: 14/344,441

(22) PCT Filed: Sep. 14, 2012

(86) PCT No.: PCT/IB2012/054827
§ 371 (c)(1),
(2), (4) Date: Aug. 12, 2014

(87) PCT Pub. No.: WO2013/038387
PCT Pub. Date: Mar. 21, 2013

(65) Prior Publication Data
US 2014/0367226 A1     Dec. 18, 2014

(30) Foreign Application Priority Data

Sep. 16, 2011   (IT) ............................... BO2011A0534

(51) Int. Cl.
*B65G 33/32* (2006.01)
*F16C 33/74* (2006.01)
*F16C 17/02* (2006.01)
*B65G 33/08* (2006.01)

(52) U.S. Cl.
CPC ............... *B65G 33/32* (2013.01); *B65G 33/08* (2013.01); *F16C 17/022* (2013.01); *F16C 33/74* (2013.01); *F16C 2326/58* (2013.01)

(58) Field of Classification Search
CPC ................ B65G 33/26; B65G 33/32
USPC .................................................. 198/672, 673
See application file for complete search history.

(56) References Cited

U.S. PATENT DOCUMENTS

| | | | | |
|---|---|---|---|---|
| 3,272,317 A * | 9/1966 | Kelly | ............ | 198/666 |
| 4,213,512 A | 7/1980 | Mazziotti | | |
| 4,220,242 A * | 9/1980 | Forsberg | ....... | 198/666 |
| 4,645,067 A * | 2/1987 | George | ......... | 198/666 |
| 5,183,148 A * | 2/1993 | Kondo | .......... | 198/674 |
| 5,263,572 A * | 11/1993 | Hove | ........... | 198/672 |
| 5,797,420 A * | 8/1998 | Nowicki et al. | ............... | 137/216 |
| 6,004,037 A | 12/1999 | Harris et al. | | |
| 6,722,490 B1 * | 4/2004 | Bass | ........... | 198/657 |

FOREIGN PATENT DOCUMENTS

| | | |
|---|---|---|
| FR | 1 538 504 | 9/1968 |
| FR | 1 541 607 | 10/1968 |
| JP | 63 037615 | 3/1988 |
| JP | H07 4424 | 1/1995 |

* cited by examiner

*Primary Examiner* — James R Bidwell
(74) *Attorney, Agent, or Firm* — Leason Ellis LLP

(57) ABSTRACT

An intermediate support for a screw conveyor, which has a first shaft rotating about an axis of rotation and defined by a number of segments; and a casing. The intermediate support has a movable assembly, which is coaxial with and rotates about the axis of rotation, is integral with the first shaft, and has a second shaft for connecting two segments, and a bushing fitted onto the second shaft; and a fixed assembly, which is coaxial with the axis of rotation, and has a supporting body fitted to the bushing and connected rigidly to the casing, and a number of annular shields coaxial with the axis of rotation and interposed between the supporting body and the bushing.

24 Claims, 3 Drawing Sheets

SCREW CONVEYOR INTERMEDIATE SUPPORT

CROSS REFERENCE TO RELATED APPLICATIONS

The present application is a U.S. National Phase of International Patent Application PCT/IB2012/054827, filed Sep. 14, 2012, which claims priority to Italian Patent Application No. BO2011A000534, filed Sep. 16, 2011, each of which is incorporated herein by reference in its entirety.

TECHNICAL FIELD

The present invention relates to a screw conveyor intermediate support.

BACKGROUND ART

As is known, screw conveyors are used for moving pulverized material, and comprise a casing, which has a load inlet at one end, an unload outlet at the other end, and two end seals for sealing the two ends, and houses a shaft with a spiral thread rotated by actuating means.

Screw conveyors may be operated at tilt angles of 0 to 90°.

Screw conveyors of this sort are normally of considerable length, so are composed of modules, the maximum length of which is designed to prevent the thread from bending and interfering with the casing.

The joins between the thread modules are fitted with intermediate supports connected to the shaft, and which provide for structural support and for transmitting motion.

U.S. Pat. No. 7,461,902 B1, for example, describes an intermediate support for a screw extruder used in the coalmining industry, and which has a shaft fitted with a thread and rotated about an axis. The intermediate supports are equally spaced along the whole length of the shaft, and each comprise two fixed half-shells connected to the inner surface of the screw extruder casing; a fixed first ring connected to the fixed half-shells; and an inner second ring fitted to and which rotates integrally with the shaft.

Intermediate supports of this type, however, have several drawbacks.

Firstly, fitting and removing them to and from the casing and the screw shaft are fairly complicated, time-consuming, and expensive in terms of downtime.

Secondly, the intermediate supports described wear out fast, by not being perfectly isolated from the pulverized material inside the conveyor, which, mixing with the grease lubricating the supports, eventually hardens, thus damaging the supports.

DISCLOSURE OF INVENTION

It is an object of the present invention to provide a screw conveyor intermediate support designed to eliminate the drawbacks of the known art, and which is cheap and easy to produce.

According to the present invention, there is provided a screw conveyor intermediate support as claimed in claim 1 and preferably in any one of the Claims depending directly or indirectly on claim 1.

According to the present invention, there is also provided a screw conveyor as claimed in claim 13.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
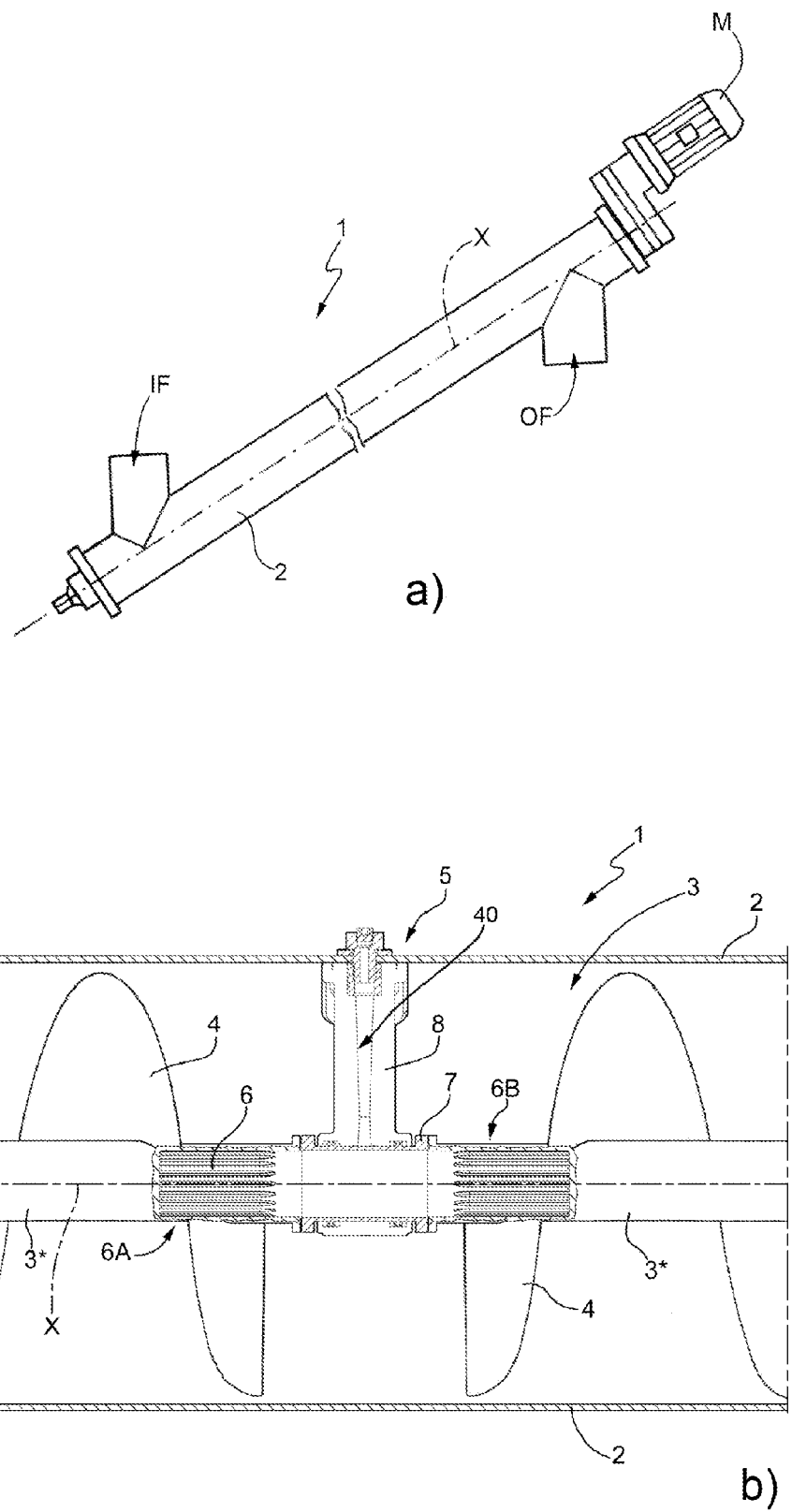
FIGS. 1 a) and b) show, respectively, a front view in perspective of a screw conveyor featuring a number of intermediate supports in accordance with the present invention, and a sectional view of the FIG. 1 a) screw conveyor, showing connection of an intermediate support to the casing and shaft.

Number 1 in FIGS. 1 a) and b) indicates as a whole a screw conveyor, in particular for moving pulverized material, such as construction cement or premix.

Screw conveyor 1 comprises a casing 2 having an inlet IF at a first end, an outlet OF at a second end, and two long-life seals for sealing the two ends.

The following description applies to screw conveyors with casings of any shape—tubular, open-topped, U-, V- or O-section—for easy feed of pulverized material.

As shown in FIG. 1 b), casing 2 houses a shaft 3 having an axis of rotation X and fitted with a thread 4. And screw conveyor 1 comprises known actuating means M, not described in detail, for rotating shaft 3.

Shaft 3 comprises a number of successive segments 3* coaxial with one another and with axis of rotation X, and connected to one another by intermediate supports 5, which, in addition to connecting segments 3* of shaft 3, also provide for structural support to prevent shaft 3 from bending. In a preferred embodiment, intermediate supports 5 are located— preferably equally spaced with respect to one another and the end seals—along the whole length of shaft 3.

Figure 2:
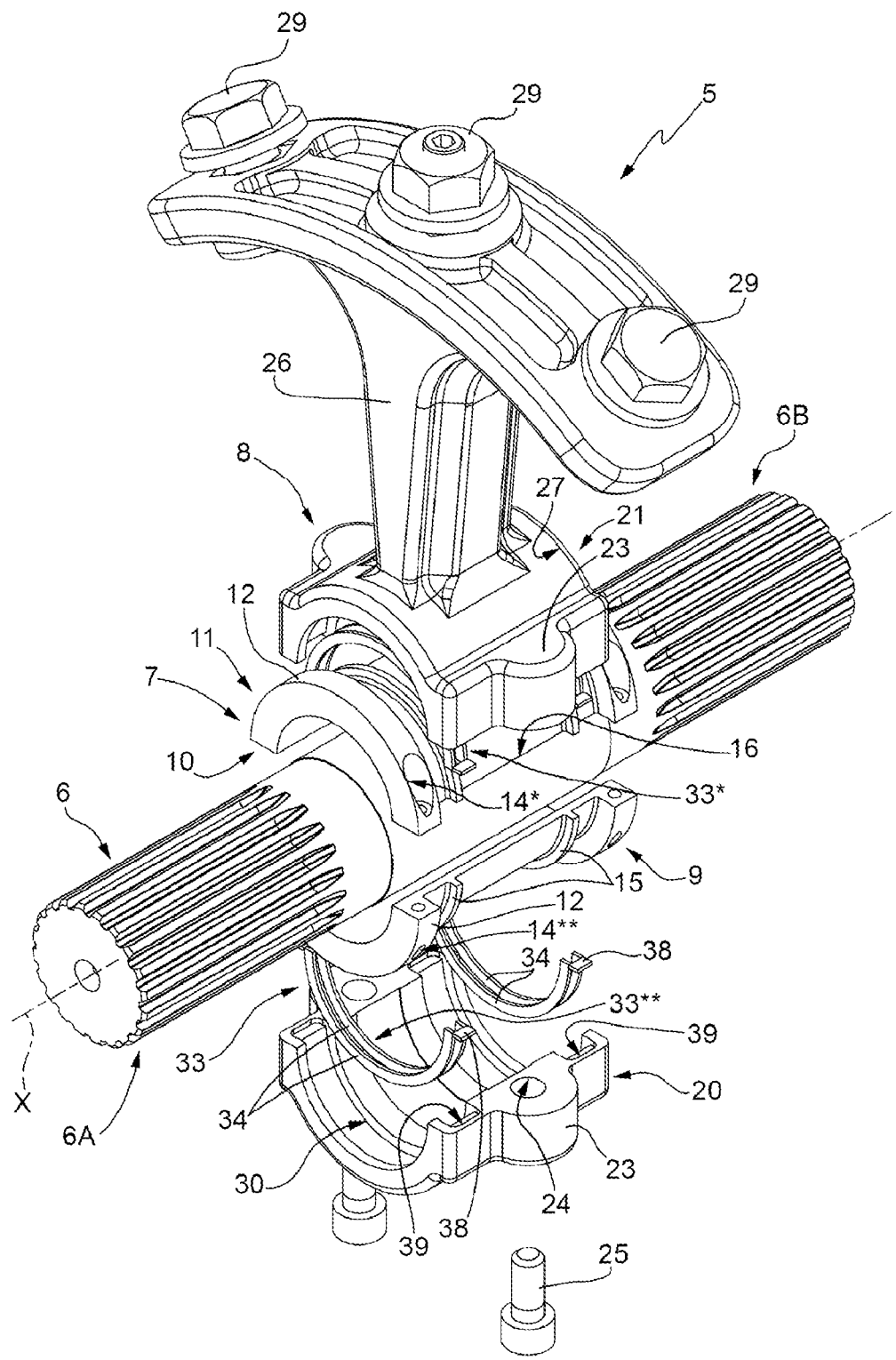
FIG. 2 shows an exploded view of the intermediate support in FIG. 1.
Figure 3:
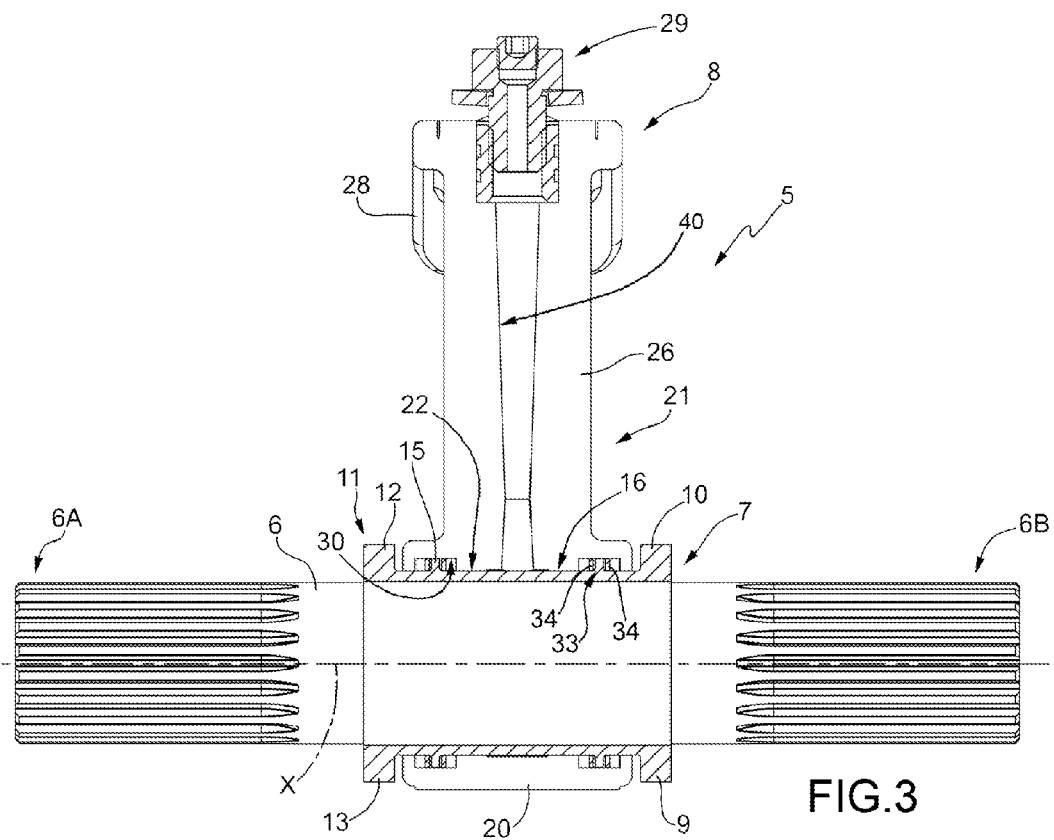
FIG. 3 is a sectional view of the intermediate support in FIG. 1.
Figure 4:
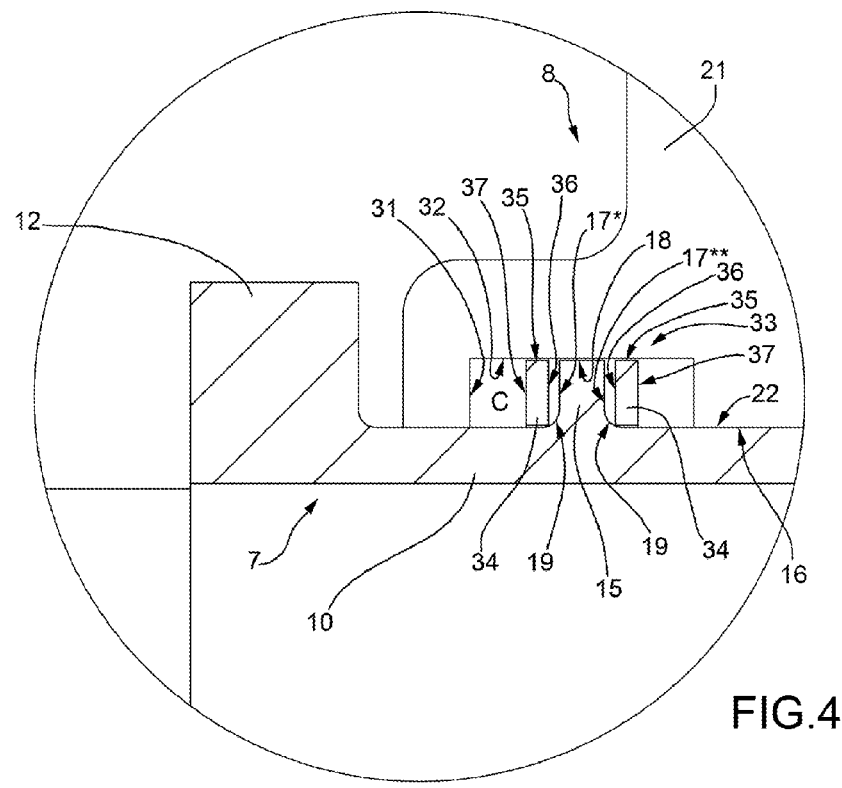
FIG. 4 shows a detail of the intermediate support in FIG. 3.

Screw conveyor 1 comprises a varying number of intermediate supports 5, depending on the length of shaft 3. The intermediate supports 5 in FIGS. 2 to 4 are identical and independent, so only one is described in detail in the following disclosure.

Intermediate support 5 comprises a connecting shaft 6; a bushing 7 fitted to connecting shaft 6; and a supporting body 8.

Connecting shaft 6 is interposed, in use, between two adjacent segments 3* of shaft 3, is positioned coaxial with axis of rotation X, and rotates about axis of rotation X integrally with shaft 3; and the two lateral ends 6A and 6B of connecting shaft 6 are preferably fitted and/or pinned to the respective ends of segments 3*.

Bushing 7 is coaxial with axis of rotation X, and comprises a bottom shell 9; a top shell 10; and, at its front and rear end, two annular appendixes 11 projecting upwards, i.e. towards casing 2, and coaxial with axis of rotation X.

Each appendix 11 is clearly divided into a top portion 12 formed on top shell 10; and a bottom portion 13 formed on bottom shell 9. Each top portion 12 and bottom portion 13 have respective through openings 14* and 14** formed on their lateral ends; and each appendix 11 may be either integrated in bushing 7, or replaced with an annular band encircling bottom shell 9 and top shell 10.

In actual use, the through openings 14* in top portions 12 are positioned directly facing through openings 14** in bottom portions 13; and through openings 14* and 14** are connected using appropriate known fastening means to grip together bottom shell 9 and top shell 10.

Bushing 7 also comprises two teeth 15 projecting towards casing 2 from the cylindrical outer surface 16 of bushing 7. As shown in FIGS. 3 and 4, each tooth 15 is annular, is coaxial with axis of rotation X, and is defined by two opposite parallel lateral surfaces 17*, 17**, by a top cylindrical surface 18, and by two connecting surfaces 19 connecting it to cylindrical outer surface 16. Lateral surfaces 17*, 17** may be flat, concave or convex.

Supporting body 8 is coaxial with axis of rotation X, and is also divided into a bottom portion 20 and a top portion 21, which, at the assembly stage, are fitted respectively to bottom shell 9 and top shell 10 of bushing 7. More specifically, in use, a cylindrical inner surface 22 of supporting body 8 is positioned entirely contacting cylindrical outer surface 16 of bushing 17. As shown more clearly in FIG. 2, each portion 20, 21 has two lateral appendixes 23 projecting laterally towards casing 2. And the two lateral appendixes 23 of bottom portion 20 have respective through holes 24 (FIG. 2) for connection to top portion 21 using known fastening means 25 (not described in detail).

Top portion 21 comprises a connecting stem 26 extending upwards towards casing 2 from a cylindrical outer surface 27, and fitted with a head 28 for connection to casing 2. Head 28 is shaped to match the contour of casing 2 and allow rigid connection of supporting body 8 to casing 2 by known fastening means 29 (not described in detail).

It is important to note that supporting body 8 only rests in contact with bushing 7, and not with connecting shaft 6.

As shown in FIGS. 2 and 3, supporting body 8 has two annular seats 30 coaxial with axis of rotation X, each designed to line up, in use, with a respective tooth 15, and each defined by two opposite parallel lateral surfaces 31, and by a cylindrical top surface 32.

Two annular chambers C for lubricating grease are thus defined, coaxially with axis of rotation X, between bushing 7 and supporting body 8. Each chamber C is greased, at an initial assembly stage of intermediate support 5, and is isolated from the outside to prevent the pulverized material inside screw conveyor 1 from mixing with the lubricating grease and damaging intermediate support 5.

An annular shield 33, coaxial with axis of rotation X, is housed inside each chamber C, between bushing 7 and supporting body 8, and comprises two portions 33*, 33**, which, during assembly, are fitted to a respective tooth 15 on top shell 10 and bottom shell 9 of bushing 7.

Each shield 33 substantially comprises two ridges 34, which are positioned close to respective tooth 15.

As shown more clearly in FIG. 4, each ridge 34 is defined by a cylindrical top surface 35; a flat inner lateral surface 36 directly facing tooth 15; and an outer lateral surface 37 opposite and parallel to lateral surface 36.

It is important to note that lateral surfaces 17*, 17** of tooth 15 and respective inner lateral surfaces 36 of ridges 34 do not contact directly, but are spaced slightly apart so as to define a gap for lubricating grease, to reduce friction between said surfaces of tooth 15 and ridges 34.

The profile of tooth 15, and particularly the presence of connecting surfaces 19, prevents lateral surfaces 17*, 17** of tooth 15 from directly contacting inner lateral surfaces 36 of ridges 34. And each shield 33 (i.e. ridges 34) rests at least partly on the two connecting surfaces 19.

It is also important to note that each chamber C (i.e. seat 30) is wider than the overall width of respective tooth 15 and shield 33 combined, so as to compensate for any axial slack due to thermal expansion or manufacturing or assembly tolerances.

Each of portions 33*, 33** of each shield 33 has two end stops 38, in particular in the form of tabs 38, each housed, in use, inside a pocket 39 in supporting body 8.

Tabs 38 serve to hold respective shield 33 in a firm position and prevent it from rotating about axis of rotation X, while at the same time allowing axial movement of shield 33.

In other words, intermediate support 5 comprises a movable assembly MA defined by connecting shaft 6 rotating about axis of rotation X, and by bushing 7 which rotates integrally with connecting shaft 6; and a fixed assembly FA defined by supporting body 8 (connected rigidly to casing 2) and by shields 33.

It is also important to note that an oil feed conduit 40 is formed in supporting body 8 to continually oil the supporting area defined by cylindrical inner surface 22 of supporting body 8 and cylindrical outer surface 16 of bushing 7.

Intermediate support 5 described has several advantages.

In particular, interposing bushing 7 between connecting shaft 6 and supporting body 8 safeguards against wear, and so prolongs the working life of, connecting shaft 6.

Bushing 7, supporting body 8, and shields 33 are each divided into a top portion or shell (10, 21, 33*) and a bottom portion or shell (9, 20, 33**) to simplify inspection and maintenance of intermediate support 5.

Finally, the way in which supporting body 8, bushing 7, and shields 33 are connected compensates for any axial slack due to thermal expansion or manufacturing or assembly tolerances, and at the same time effectively shields chambers C from the pulverized material and dust circulating inside screw conveyor 1.

The invention claimed is:

1. An intermediate support (5) for a screw conveyor (1) comprising a first shaft (3) rotating about an axis of rotation (X), and a casing (2) coaxial with the axis of rotation (X); the intermediate support (5) comprising:
   a movable assembly (MA), which is coaxial with and rotates about the axis of rotation (X), is integral with the first shaft (3), and comprises a second shaft (6), and a bushing (7) fitted to the second shaft (6); and
   a fixed assembly (FA), which is also coaxial with the axis of rotation (X), and comprises a supporting body (8) fitted to said bushing (7) and connected rigidly to the casing (2);
   wherein the fixed assembly (FA) also comprises a number of annular shields (33) coaxial with the axis of rotation (X) and interposed between the supporting body (8) and the bushing (7);
   wherein each shield (33) is housed inside a respective chamber (C) defined between the supporting body (8) and the bushing (7); and the bushing (7) comprises a number of annular teeth (15) coaxial with the axis of rotation (X) and each projecting inside a respective said chamber (C) from a cylindrical outer surface (16) of the bushing (7); each of said teeth (15) cooperating with a respective shield (33);
   wherein each shield (33) fits over a respective tooth (15); and each shield 33 comprises two ridges (34), each positioned facing and close to the respective tooth (15).

2. A support as claimed in claim 1, wherein the ridges (34) engage the respective tooth (15) so that a lateral surface (36) of each ridge (34) does not contact a corresponding lateral surface (17*, 17**) of the respective tooth (15).

3. A support as claimed in claim 1, wherein each chamber (C) is defined by an annular seat (30) coaxial with the axis of rotation (X) and formed in the supporting body (8).

4. A support as claimed in claim 3, wherein the seat (30) is wider than the shield (33).

5. A support as claimed in claim 1, wherein each shield (33) is divided into a bottom portion (33**) and a top portion (33*), which are fitted onto the bushing (7) at assembly.

6. A support as claimed in claim 1, wherein a cylindrical inner surface (22) of the supporting body (8) is positioned entirely contacting a cylindrical outer surface (16) of the bushing (7).

7. A screw conveyor (1) for conveying pulverized material, and comprising a number of intermediate supports (5) as claimed in claim 1.

8. A screw conveyor as claimed in claim 7, and comprising a first shaft (3) in turn comprising a number of segments (3*) rotating about an axis of rotation (X) and connected successively to one another by respective intermediate supports (5); the second shaft (6) of each intermediate support (5) being designed to connect two consecutive segments (3*).

9. An intermediate support (5) for a screw conveyor (1) comprising a first shaft (3) rotating about an axis of rotation (X), and a casing (2) coaxial with the axis of rotation (X); the intermediate support (5) comprising:
- a movable assembly (MA), which is coaxial with and rotates about the axis of rotation (X), is integral with the first shaft (3), and comprises a second shaft (6), and a bushing (7) fitted to the second shaft (6); and
- a fixed assembly (FA), which is also coaxial with the axis of rotation (X), and comprises a supporting body (8) fitted to said bushing (7) and connected rigidly to the casing (2);
- wherein the fixed assembly (FA) also comprises a number of annular shields (33) coaxial with the axis of rotation (X) and interposed between the supporting body (8) and the bushing (7); wherein each shield (33) is housed inside a respective chamber (C) defined between the supporting body (8) and the bushing (7);
- wherein the bushing (7) comprises a number of annular teeth (15) coaxial with the axis of rotation (X), and each projecting inside a respective said chamber (C) from a cylindrical outer surface (16) of the bushing (7); each of said teeth (15) cooperating with a respective shield (33);
- wherein each tooth (15) is defined by two opposite parallel flat lateral surfaces (17*, 17**), by a cylindrical top surface (18), and by two connecting surfaces (19) connecting the tooth to the cylindrical outer surface (16) of the bushing.

10. A support as claimed in claim 9, wherein each shield (33) rests at least partly on said two connecting surfaces (19).

11. A screw conveyor (1) for conveying pulverized material, and comprising a number of intermediate supports (5) as claimed in claim 9.

12. An intermediate support (5) for a screw conveyor (1) comprising a first shaft (3) rotating about an axis of rotation (X), and a casing (2) coaxial with the axis of rotation (X); the intermediate support (5) comprising:
- a movable assembly (MA), which is coaxial with and rotates about the axis of rotation (X), is integral with the first shaft (3), and comprises a second shaft (6), and a bushing (7) fitted to the second shaft (6); and
- a fixed assembly (FA), which is also coaxial with the axis of rotation (X), and comprises a supporting body (8) fitted to said bushing (7) and connected rigidly to the casing (2);
- wherein the fixed assembly (FA) also comprises a number of annular shields (33) coaxial with the axis of rotation (X) and interposed between the supporting body (8) and the bushing (7);
- wherein each shield (33) is fitted with at least one stop (38) for preventing rotation of the shield (33) about the axis of rotation (X), while allowing a small amount of axial movement of the shield.

13. A support as claimed in claim 12, wherein each shield (33) is housed inside a respective chamber (C) defined between the supporting body (8) and the bushing (7).

14. A support as claimed in claim 13, and the bushing (7) comprises a number of annular teeth (15) coaxial with the axis of rotation (X) and each projecting inside a respective said chamber (C) from a cylindrical outer surface (16) of the bushing (7); each of said teeth (15) cooperating with a respective shield.

15. A support as claimed in claim 14, wherein each shield (33) fits over a respective tooth (15); and each shield (33) comprises two ridges (34), each positioned facing and close to the respective tooth (15).

16. A support as claimed in claim 15, wherein the ridges (34) engage the respective tooth (15) so that a lateral surface (36) of each ridge (34) does not contact a corresponding lateral surface (17*, 17**) of the respective tooth (15).

17. A support as claimed in claim 15, wherein each tooth (15) is defined by two opposite parallel flat lateral surfaces (17*, 17**), by a cylindrical top surface (18), and by two connecting surfaces (19) connecting the tooth to the cylindrical outer surface (16) of the bushing.

18. A support as claimed in claim 17, wherein each shield (33) rests at least partly on said two connecting surfaces (19).

19. A support as claimed in claim 12, wherein each chamber (C) is defined by an annular seat (30) coaxial with the axis of rotation (X) and formed in the supporting body (8).

20. A support as claimed in claim 19, wherein the seat (30) is wider than the shield (33).

21. A support as claimed in claim 12, wherein each shield (33) is divided into a bottom portion (33**) and a top portion (33*), which are fitted onto the bushing (7) at assembly.

22. A support as claimed in claim 12, wherein a cylindrical inner surface (22) of the supporting body (8) is positioned entirely contacting a cylindrical outer surface (16) of the bushing (7).

23. A screw conveyor (1) for conveying pulverized material, and comprising a number of intermediate supports (5) as claimed in claim 12.

24. A screw conveyor as claimed in claim 23, and comprising a first shaft (3) in turn comprising a number of segments (3*) rotating about an axis of rotation (X) and connected successively to one another by respective intermediate supports (5); the second shaft (6) of each intermediate support (5) being designed to connect two consecutive segments (3*).

* * * * *